United States Patent Office 3,325,498
Patented June 13, 1967

3,325,498
PREPARATION OF SYMMETRICAL OCTA-
HYDROACRIDINE
Louis R. Freimiller, Philadelphia, and Joseph William Nemec, Rydal, Pa., assignors to Rohm & Haas Company, Philadelphia, Pa., a corporation of Delaware
No Drawing. Filed Mar. 2, 1964, Ser. No. 348,762
4 Claims. (Cl. 260—279)

This invention is concerned with a method for producing symmetrical octahydroacridine. It further deals with a readily reproducible and reliable method for producing symmetrical octahydroacridine in good yields.

The present process comprises the formation of symmetrical octahydroacridine by a reaction involving methylene-bis-2,2'-cyclohexanone. The reaction involves a condensation which leads to the liberation of water and a by-product having the empirical formula $C_{13}H_{21}ON$.

Either anhydrous ammonia or the commercially available aqueous ammonia solutions may be employed. The use of anhydrous ammonia is preferred since it simplifies separation procedures and generally tends to maximize yields of desired product. The reaction is equimolecular in nature, but an excess of ammonia is usually employed in order to assure highest yields.

The reaction is conducted in a temperature range of about 100° to 160° C., preferably 140° to 160° C. Since the ammonia is a very volatile substance, the reaction is conducted in a contained reactor, such as an autoclave or other laboratory bomb. The reaction is satisfactorily conducted employing autogenous pressure.

While a solvent is not necessary, it is sometimes preferred to employ an inert, organic, volatile solvent, such as aromatic and aliphatic hydrocarbons and alcohols. Suitable in this respect are hexane, octane, benzene, toluene, xylene, ethanol, butanol and the like.

At the conclusion of the reaction, excess ammonia and water are removed by stripping and also any solvent, if such were employed. The residue consists of the desired product, symmetrical octahydroacridine, and another solid having the empirical formula $C_{13}H_{21}ON$. Hexane is added to the solid material, dissolving the symmetrical octahydroacridine. The by-product is then readily filtered off. The symmetrical octahydroacridine can be further purified by recrystallization from hexane and then isolated by stripping off the hexane.

The symmetrical octahydroacridine is then ready for known uses in the herbicide and fungicide fields.

The present invention may be more fully understood from the following example which is offered by way of illustration and not by way of limitation. Parts by weight are used throughout.

Example

A Parr two-liter stirring autoclave is charged with 104 parts (0.5 mole) of methylene-bis-2,2'-cyclohexanone, 200 parts of toluene and 85 parts (5 moles) of anhydrous ammonia. Stirring is started and the mixture heated at 136° to 157° C. for five hours, then cooled. Excess ammonia is boiled from the mixture and water and toluene are stripped off under reduced pressure. The residue is then distilled at 89° to 170° C. at .04 to .33 mm. of mercury. The separation of the product from the by-product is accomplished by first suction filtration of the distillation components in which crystals had formed on standing. The crystals are treated with hexane dissolving the symmetrical octahydroacridine and leaving the by-product, $C_{13}H_{21}ON$, which is filtered off. The oily filtrate (which is apparently an eutectic mixture of the two products) is further treated with hexane and this causes the insoluble $C_{13}H_{21}ON$ to precipitate. The symmetrical octahydroacridine which is isolated from the hexane is recrystallized twice from this solvent. It has a melting point of 71° to 72° C. and is obtained in a yield of 53.8% (50.3 parts).

The product, $C_{13}H_{17}N$, contains 83.12% carbon (theoretical 83.26%), 9.01% hydrogen (theoretical 9.17%) and 7.44% nitrogen (theoretical 7.48%).

The by-product, $C_{13}H_{21}ON$, is recrystallized from a hexane-benzene mixture. It has a melting point of 191° to 195° C. and is obtained in a yield of 33.6% (34.8 parts).

The by-product contains 75.23% carbon (theoretical 75.30%), 10.31% hydrogen (theoretical 10.23%), 6.68% nitrogen (theoretical 6.76%) and 7.98% oxygen (theoretical 7.71%).

We claim:
1. A method for the preparation of symmetrical octahydroacridine comprising condensing methylene-bis-2,2'-cyclohexanone and ammonia.
2. A method for the preparation of symmetrical octahydroacridine comprising reacting methylene-bis-2,2'-cyclohexanone and ammonia at a temperature of about 100° C. to 160° C. with the evolution of water.
3. A method according to claim 2 in which the reaction temperature is about 140° C. to 160° C.
4. A method according to claim 2 in which the reaction is conducted in the presence of an inert volatile organic solvent.

No reference cited.

ALEX MAZEL, Primary Examiner.

DONALD G. DAUS, Assistant Examiner.